(12) United States Patent
Hertter et al.

(10) Patent No.: US 9,095,900 B2
(45) Date of Patent: Aug. 4, 2015

(54) GENERATIVE PRODUCTION METHOD AND POWDER THEREFOR

(75) Inventors: Manuel Hertter, Munich (DE); Erwin Bayer, Dachau (DE); Markus Waltemathe, Hannover (DE); Klaus Broichhausen, Groebenzell (DE); Wilhelm Meir, Gablingen (DE); Bertram Kopperger, Dachau (DE); Josef Waermann, Viehbach (DE); Andreas Jakimov, Munich (DE)

(73) Assignee: MTU AERO ENGINES AG, Munich (DE)

( * ) Notice: Subject to any disclaimer, the term of this patent is extended or adjusted under 35 U.S.C. 154(b) by 0 days.

(21) Appl. No.: 13/822,711

(22) PCT Filed: Sep. 12, 2011

(86) PCT No.: PCT/DE2011/001731
§ 371 (c)(1),
(2), (4) Date: Sep. 24, 2013

(87) PCT Pub. No.: WO2012/048676
PCT Pub. Date: Apr. 19, 2012

(65) Prior Publication Data
US 2014/0072823 A1    Mar. 13, 2014

(30) Foreign Application Priority Data
Sep. 24, 2010   (DE) .......................... 10 2010 046 468

(51) Int. Cl.
*B22F 3/105* (2006.01)
*B22F 1/02* (2006.01)
*B29C 67/04* (2006.01)

(52) U.S. Cl.
CPC .............. *B22F 3/1055* (2013.01); *B22F 1/02* (2013.01); *B22F 1/025* (2013.01); *B29C 67/04* (2013.01); *Y10T 428/12181* (2015.01)

(58) Field of Classification Search
USPC ..................................... 419/6, 7, 35; 264/497
See application file for complete search history.

(56) References Cited

U.S. PATENT DOCUMENTS

| 5,156,697 A | * | 10/1992 | Bourell et al. ................. 264/497 |
| 5,745,834 A | * | 4/1998 | Bampton et al. ................. 419/37 |
| 5,908,569 A | | 6/1999 | Wilkening et al. |
| 7,141,207 B2 | | 11/2006 | Jandeska, Jr. et al. |
| 7,946,467 B2 | * | 5/2011 | Cretegny ...................... 228/56.3 |
| 8,034,279 B2 | | 10/2011 | Dimter et al. |
| 2006/0045787 A1 | | 3/2006 | Jandeska, Jr. et al. |
| 2006/0251535 A1 | | 11/2006 | Pfeifer et al. |
| 2008/0142575 A1 | * | 6/2008 | Cretegny ...................... 228/256 |
| 2008/0241392 A1 | | 10/2008 | Dimter et al. |
| 2009/0321998 A1 | * | 12/2009 | Gersch et al. ................. 264/497 |

FOREIGN PATENT DOCUMENTS

| DE | 19516972 C1 | 12/1996 |
| DE | 112005002040 T5 | 7/2007 |
| DE | 102007014683 A1 | 10/2008 |
| JP | 2006257463 A | 9/2006 |

OTHER PUBLICATIONS

Tolochko N et al. "Selective laser sintering of single- and two-component metal powders", Rapid Prototyping Journal Emerald UK, vol. 9, No. 2, 2003, pp. 68-78.
Ceramics 5.2 for Eosint S. Datenblatt. EOS GmbH, 2002. http://www.detekt.com.tw/pdf/%E6%9D%90%E6%96%99/Material/%E7%9F%BD%E7%A0%82-Sand/MaterialData_Ceramics5-2_en%C2%A7.pdf accessed Jun. 21, 2011.

* cited by examiner

*Primary Examiner* — George Wyszomierski
*Assistant Examiner* — Ngoclan T Mai
(74) *Attorney, Agent, or Firm* — Abel Law Group, LLP

(57) ABSTRACT

The invention relates to a generative production method for producing a component by selectively melting and/or sintering a powder several times consecutively by introducing an amount of heat by means of beam energy, such that the powder particles melt and/or sinter in layers, wherein the powder particles (1) are made of a first material (2) and the powder particles are surrounded by a second material (3) partially or over the entire surface thereof, wherein the second material has a lower melting point than the first material and/or lowers the melting point of the first material when mixed with the first material. The invention further relates to a corresponding powder and to a prototype produced from said powder.

20 Claims, 1 Drawing Sheet

GENERATIVE PRODUCTION METHOD AND POWDER THEREFOR

BACKGROUND OF THE INVENTION

1. Field of the Invention

The present invention relates to a generative production method for producing a component by the repeated, consecutive selective melting and/or sintering of a powder by means of a quantity of heat introduced by beam energy, such that the powder particles fuse and/or sinter in layers. In addition, the present invention relates to a corresponding powder and also to a component produced therefrom.

2. Prior Art

An extremely wide variety of methods are known from the prior art for rapidly producing a component. In addition to what is termed three-dimensional printing (3D printing), there are beam methods, such as electron beam melting, selective laser melting, selective laser sintering, and many other methods, for example stereolithography or casting methods and the like. Although primarily prototypes can thereby be generated in a very rapid manner, the methods actually differ in principle.

DE 11 2005 002 040 T5 discloses, for example, a rapid prototyping method for producing aluminum/magnesium alloys by means of a 3D printing method. In this method, the aluminum/magnesium particles are firstly joined to one another by means of a binder to form the prototype in the printing method and then sintered, such that the prototype is formed. Since the aluminum and/or magnesium alloys are very susceptible to oxidation, the corresponding powder particles are protected by a metal layer made of, for example, copper. However, such a method is limited to low-melting materials, since, in the case of high-melting materials, the prototype as a whole has to be exposed to very high temperatures over a long period of time in order to achieve a sufficient sintered join.

US 2006/0251535 A1 discloses a further method, in which three-dimensional prototypes are formed from coated powder particles by binder-assisted printing. The coating of the particles which is made of binders and sinterable materials serves to make joining of the powder particles to one another possible in that the coatings or parts thereof fuse, weld or sinter to one another in order to thus form corresponding bridges between the powder particles.

The disadvantage of these methods, however, is that the properties of the prototype differ greatly from the actual workpiece, since the particles are not directly themselves joined but rather are "adhesively bonded" to one another by way of the binders and/or sinter materials.

Although this method would afford the possibility to produce a prototype with relatively little use of heat and energy for high-melting materials, i.e. in particular high-temperature materials, the result is unsatisfactory, since the properties, in particular the mechanical properties, of the prototype differ greatly from those of the later workpiece.

When beam-assisted methods, i.e. for example laser beam methods or electron beam methods, are used for the production of prototypes from high-melting materials, there is additionally the problem that such a high quantity of heat has to be introduced into the powder or into the surface of the already formed prototype, in order to make fusion or sintering possible, that high temperature gradients which can lead to cracking arise. If, however, cracks are made in the prototypes, in such a case, too, the mechanical properties differ considerably from the actual workpiece, and therefore this too is disadvantageous.

DISCLOSURE OF THE INVENTION

Object of the Invention

It is an object of the present invention, therefore, to provide a generative production method with which it is possible to form components from high-melting materials which, in terms of their property profile, come as close as possible to the workpieces, which have been produced, for example, by casting. In addition, the present invention is intended to provide corresponding means for carrying out the method. It should be possible at the same time for the generative production method to be carried out simply and reliably, however.

Technical Solution

This object is achieved by a method, a powder and a component as set forth in the appended claims.

The invention is based on the understanding that components can be produced from high-melting materials by the selective melting and/or sintering of powders by means of beam methods, since the corresponding high-energy beams, such as laser beams or electron beams, can provide the energy required for the fusion or for the sintering of the powder particles. In such generative production methods, a laser beam or electron beam is thus moved over a powder layer in accordance with the form to be generated, with the locally introduced energy melting or sintering the powder selectively at this point, such that a three-dimensional form can be built up in layers with the repeated application of powder and corresponding irradiation with a high-energy beam. According to the invention, the problem of cracking resulting from a high temperature gradient, which arises as a result of the sintering or melting in the component or the directly joined particles, is counteracted by the fact that use is made of powder particles which are formed from a first material from which the prototype per se is to be formed, and furthermore comprise a second material which surrounds the powder particles in part or over the entire surface, wherein the second material has a lower melting point than the first material and/or has a property which lowers the melting point of the first material when it makes contact and/or is mixed with the first material. This has the effect, for example in the case of high-melting materials, that the thermal energy introduced can be reduced, such that smaller temperature gradients arise in the component or the last layer of the produced component, which avoids cracking.

The first material can be, for example, a high-melting material which in particular has a melting point of more than 1000° C., preferably more than 1250° C. or extremely preferably more than 1500° C. By way of example, the first material can be a nickel-base alloy, an iron-base alloy, a cobalt-base alloy, an MCrAl alloy where M is equal to nickel and/or cobalt, or tungsten or a tungsten alloy.

The second material can be what is termed a sintering aid or a high-temperature solder which has the above-mentioned properties with respect to the first material. In particular, the second material can be formed by boron, germanium or silicon or corresponding materials which comprise one or more of the aforementioned elements.

The second material can be arranged in the form of a shell around a core made of the first material in a powder particle of the rapid prototyping powder according to the invention.

The second material can also be arranged in particular in the form of particles in an ultrafine distribution on the surface of the first material, such that the first material in the form of a powder particle core is not completely surrounded by the second material. This makes it possible for the proportion of the second material in the finished component to be reduced in particular to such an extent that the influence of the second material on the property profile of the component is negligible.

In principle, it is possible, depending on the type of arrangement of the first and second material in the powder particles, for the quantity of the second material to be set in such a manner that the powder particles can be sufficiently crosslinked by way of the beam energy introduced, wherein the melting point of the first material is correspondingly lowered locally by at least 5%, preferably at least 10%, while the proportion of the second material in the finished component is so low that the melting point of the component is at least 90%, preferably more than 95%, of the melting temperature of the first material. At the same time or alternatively, the quantity of the second material can be set in such a manner that the phase or microstructure formation of the first material which is to be expected is not influenced in the finished component, i.e. the second material does not form any separate phase or microstructure constituents or precipitations.

Therefore, the selected distribution of the first and second material in the starting material in the core and at the edge of the powder particle can achieve the direct joining of the particles of the first material to one another with relatively little use of energy, while the second material is dissolved in the component in such a way that the property profile of the component is determined by the first material.

This can be improved further in particular by virtue of the fact that the component is subjected to a heat treatment with and without pressure, such that the second material can dissolve uniformly or can be distributed by way of appropriate diffusion processes in the first material.

In order to achieve a reduction in the temperature gradient when producing the component, in particular in the layers which have just been fused or/and sintered, the prototype and/or the powder can correspondingly also be preheated and/or heated to a correspondingly higher temperature in addition to the locally applied beam energy in order to keep the temperature gradient low. By way of example, this can be effected by resistance heating by applying an appropriate current or voltage source to the powder and/or the partially finished component. This can also be effected by induction heating, and therefore the cooling rate can also thus be controlled.

A component produced in accordance with the invention is distinguished by the fact that it consists, without cracking, of a first, high-melting material which comprises a second material which reduces the melting point in small proportions without influencing the phase and/or microstructure formation of the first material. The particles of the original powder made of the first material are joined directly to one another in the component without additional binders or binder phases or the like being needed.

BRIEF DESCRIPTION OF THE DRAWINGS

Further advantages, characteristics and features of the present invention will become clear in the following detailed description of an exemplary embodiment with reference to the accompanying drawing. The drawing shows in this respect purely schematically in FIG. 1 a sectional view of a powder particle according to the invention.

EXEMPLARY EMBODIMENT

Figure 1:
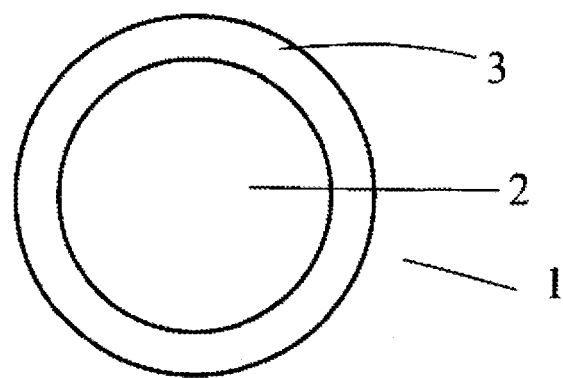

FIG. 1 shows a first exemplary embodiment of a powder particle which is formed according to the invention. The powder particle 1 has a core 2, which is surrounded by a shell 3 surrounding the core 2 over the entire surface. The core 2 is formed by a high-melting material, for example a high-melting metal or a metal alloy, for example an iron-base, nickel-base or cobalt-base alloy, MCrAlY alloys where M is equal to nickel and/or cobalt, or the like. The surrounding shell 3 is formed from a second material, which differs from the first material of the core 2 and has a lower melting temperature than the core 2 and/or in combination with the first material of the core 2 lowers the melting point of the first material.

If, for example, use is made of a powder having the powder particles 1 shown in FIG. 1 in a generative production method with selective melting or sintering by means of beam energy, for example electron beam melting, selective laser melting, selective laser sintering or a similar method in which energy is applied to the powder with a beam, and a powder particle 1 is melted at the edge or heated to such an extent that the second material of the shell 3 diffuses into the first material of the core 2, this leads to a mixture of the two materials which leads to a reduction in the melting point of the first material of the core 2. Correspondingly, it is possible with relatively little use of heat to join the powder particles 1 lying next to one another or powder particles 1 to the layer of the component which has formed in a step which has already taken place, in that the powder particles 1 weld to one another or to a previously formed layer of the component, sinter in liquid form or sinter in a solid phase by diffusion. Correspondingly, the property of the second material of the shell 3 whereby it reduces the melting point can also be utilized to the effect that better mutual diffusion of the constituents of the first material with adjacent particles is made possible.

Figure 2:
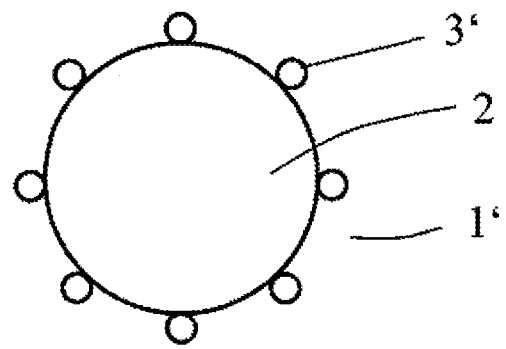
FIG. 2 a sectional view of a second exemplary embodiment of a powder particle according to the invention; and in FIG. 3 a sectional view through part of a microstructure of the prototype produced according to the invention.

FIG. 2 shows a second embodiment of a powder particle 1' according to the invention, which in turn comprises a core 2 made of a first, high-melting material; however, the surface of said core is not provided with a shell surrounding it over the entire surface, but instead the second material is provided in the form of ultrafine particles 3' distributed over the surface, such that the core 2 is only partially covered. The mode of operation is similar to the powder, as has been described in the case of the powder particles 1 shown in FIG. 1. Under the action of beam energy, the arrangement of the ultrafine particles 3' on the surface of the core 2 leads, for example, to local melting at the site of the particles 3', since the melting point of the first material is lowered there, such that fusion or sintering of the first material with adjacent powder particles 1' is possible at these sites without subsequent heat treatment.

Figure 3:
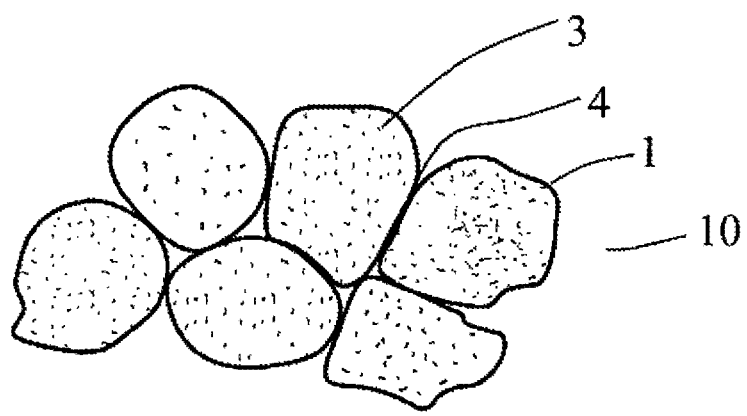

FIG. 3 shows part of a component 10 produced according to the invention in the form of a schematically illustrated microstructure section. FIG. 3 shows a plurality of powder particles 1 which are sintered together and are fused to one another at the interfaces 4 thereof by corresponding melting. The second material 3 which originally existed in the form of a shell or particles in an ultrafine distribution on the surface is now dissolved in the microstructure grains, which is intended to be expressed by the dotted illustration. Correspondingly, the proportion of the second material in the prototype 10 is so low that no additional phases form that are present in addition to the phases of the first material.

With the method according to the invention, it is therefore possible to process high-melting materials by a generative production method to form a component which comes very close to the property profile of the later workpiece, since the sintering aids exist in the form of the second material in such a low proportion that they have only an extremely small, negligible influence on the component. Furthermore, such prototypes can be produced from high-melting materials without cracking, since the quantity of heat introduced can be reduced on account of the second material, which serves as a sintering or melting aid, and therefore a smaller temperature gradient is generated at those sites at which the energy beam has acted on the powder or the prototype. On account of the smaller temperature gradient, the risk of cracking is reduced.

Although the present invention has been described in detail with reference to the exemplary embodiments, the invention is not limited to these exemplary embodiments, but rather the invention can be varied within the scope of protection of the accompanying claims by a different combination of individual presented features and the omission of individual features. In particular, the present invention claims all combinations of all of the presented features.

What is claimed is:

1. A generative production method for producing a component by repeated, consecutive selective melting and/or sintering of a powder by heat introduced by beam energy, such that powder particles fuse and/or sinter in layers, wherein the method comprises using powder particles of a first material which are surrounded in part or over an entire surface thereof by a second material that has a lower melting point than that of the first material and/or has a property which lowers the melting point of the first material when it is mixed with the first material, the first material being selected from Ni-based alloys, Fe-based alloys, Co-based alloys, alloys of formula MCrAl where M is Ni or Co, tungsten, and tungsten alloys, and the second material comprising on or more of boron, germanium and silicon; and wherein
  (i) the first material has a melting point of more than 1500° C.; and/or
  (ii) the method further comprises subjecting the component to a heat treatment with and without pressure, such that the second material is distributed uniformly in the first material; and/or
  (iii) the method further comprises preheating the powder or heating the powder by energy in addition to the beam energy.

2. The method of claim 1, wherein the first material has a melting point of more than 1500° C.

3. The method of claim 1, wherein the method comprises subjecting the component to a heat treatment with and without pressure, such that the second material is distributed uniformly in the first material.

4. The method of claim 1, wherein the method comprises preheating the powder or heating the powder by energy in addition to the beam energy.

5. A generative production method for producing a component by repeated, consecutive selective melting and/or sintering of a powder by heat introduced by beam energy, such that powder particles fuse and/or sinter in layers, wherein the method comprises using powder particles of a first material which are surrounded in part or over an entire surface thereof by a second material that has a lower melting point than that of the first material and/or has a property which lowers the melting point of the first material when it is mixed with the first material, and wherein the second material is provided in such a quantity that when heat is locally introduced by the beam energy, the powder particles are sufficiently crosslinked, the melting point of the first material is lowered locally by at least 5%, and the proportion of the second material in a finished prototype is low enough for a melting point of the prototype to be at least 90% of a melting point of the first material and/or for a phase of the first material which would be present without the second material to be present in the component.

6. The method of claim 5, wherein the melting point of the first material is lowered locally by at least 10%.

7. The method of claim 5, wherein the melting point of the prototype is at least 95% of the melting point of the first material.

8. The method of claim 6, wherein the melting point of the prototype is at least 95% of the melting point of the first material.

9. The method of claim 5, wherein the first material is selected from Ni-based alloys, Fe-based alloys, Co-based alloys, alloys of formula MCrAl where M is Ni or Co, tungsten, and tungsten alloys.

10. The method of claim 5, wherein the second material comprises one or more of boron, germanium, and silicon.

11. The method of claim 5, wherein the second material is present on the surface of the first material as particles in an ultrafine distribution.

12. The method of claim 5, wherein the first material has a melting point of more than 1000° C.

13. The method of claim 5, wherein the first material has a melting point of more than 1250° C.

14. The method of claim 5, wherein the first material has a melting point of more than 1500° C.

15. A generative production method for producing a component by repeated, consecutive selective melting and/or sintering of a powder by heat introduced by beam energy, such that powder particles fuse and/or sinter in layers, wherein the method comprises using powder particles of a first material which comprise distributed on the surfaces thereof particles of a second material that has a lower melting point than that of the first material and/or has a property which lowers the melting point of the first material when it is mixed with the first material; and wherein
  (i) the first material has a melting point of more than 1500° C.; and/or
  (ii) the method further comprises subjecting the component to a heat treatment with and without pressure, such that the second material is distributed uniformly in the first material; and/or
  (iii) the method further comprises preheating the powder or heating the powder by energy in addition to the beam energy.

16. The method of claim 15, wherein the first material has a melting point of more than 1500° C.

17. The method of claim 15, wherein the first material is selected from Ni-based alloys, Fe-based alloys, Co-based alloys, alloys of formula MCrAl where M is Ni or Co, tungsten, and tungsten alloys.

18. The method of claim 15, wherein the second material comprises one or more of boron, germanium, and silicon.

19. The method of claim 15, wherein the method comprises preheating the powder or heating the powder by energy in addition to the beam energy.

20. The method of claim 15, wherein the method comprises subjecting the component to a heat treatment with and without pressure, such that the second material is distributed uniformly in the first material.

* * * * *